(12) United States Patent
Weber et al.

(10) Patent No.: US 9,447,510 B2
(45) Date of Patent: Sep. 20, 2016

(54) PROCESSES FOR THE PRODUCTION OF CHLORINE FROM HYDROGEN CHLORIDE AND OXYGEN

(75) Inventors: Rainer Weber, Odenthal (DE); Jürgen Kintrup, Leverkusen (DE); Andreas Bulan, Langenfeld (DE); Friedhelm Kämper, Krefeld (DE)

(73) Assignee: Covestro Deutschland AG (DE)

( * ) Notice: Subject to any disclaimer, the term of this patent is extended or adjusted under 35 U.S.C. 154(b) by 1342 days.

(21) Appl. No.: 11/749,808

(22) Filed: May 17, 2007

(65) Prior Publication Data

US 2008/0029404 A1   Feb. 7, 2008

(30) Foreign Application Priority Data

May 18, 2006   (DE) .................. 10 2006 023 261

(51) Int. Cl.
   *C25B 1/26* (2006.01)
   *C01B 7/04* (2006.01)

(52) U.S. Cl.
   CPC . *C25B 1/26* (2013.01); *C01B 7/04* (2013.01); *Y02P 20/228* (2015.11)

(58) Field of Classification Search
   CPC ........................................................ C25B 1/26
   USPC ................................................. 205/618, 620
   See application file for complete search history.

(56) References Cited

U.S. PATENT DOCUMENTS 3,773,634 A   11/1973   Stacey et al.
4,025,405 A    5/1977   Dotson et al.

(Continued)

FOREIGN PATENT DOCUMENTS

DE   1 567 788   5/1970
DE    88 309    5/1971

(Continued)

OTHER PUBLICATIONS

"Phosgen," *Ullmanns Enzyklopädie der industriellen Chemie* (1962), pp. 494-500, Third Edition, vol. 13, Urban & Schwarzenberg, München-Berlin.

(Continued)

*Primary Examiner* — Nicholas A Smith
(74) *Attorney, Agent, or Firm* — Drinker Biddle & Reath LLP (57) ABSTRACT

Processes for the production of chlorine by multi-stage oxidation, for example, by thermal reaction of hydrogen chloride with oxygen using catalysts or by non-thermal activated reaction of hydrogen chloride with oxygen, in which the gas mixture formed in the reaction, comprising the target products chlorine and water, unreacted hydrogen chloride and oxygen, and possibly other secondary constituents, such as carbon dioxide and nitrogen, (a) is cooled to condense hydrochloric acid as an aqueous solution of hydrogen chloride and (b) the aqueous solution of hydrogen chloride formed is separated from the gas mixture, characterised in that (c) the separated aqueous solution of hydrogen chloride is fed at least partially to an electrochemical oxidation in which at least part of the hydrogen chloride is oxidised to chlorine, (d) the chlorine gas occurring in step d) is optionally added to the gas mixture occurring in step c), (e) the residues of water present in the gas mixture from steps c) and e), in particular by washing with sulfuric acid, are removed, (f) the chlorine-rich gas mixture forming is freed of oxygen and optionally of secondary constituents.

12 Claims, 1 Drawing Sheet

(56) References Cited

U.S. PATENT DOCUMENTS

| | | |
|---|---|---|
| 4,402,811 A | 9/1983 | Klotz et al. |
| 4,539,082 A | 9/1985 | Klotz et al. |
| 4,764,308 A | 8/1988 | Sauer et al. |
| 4,803,065 A | 2/1989 | Itoh et al. |
| 5,449,818 A | 9/1995 | Biskup et al. |
| 5,575,985 A | 11/1996 | Klotz et al. |
| 5,707,919 A | 1/1998 | Miyata et al. |
| 5,925,783 A | 7/1999 | Jost et al. |
| 5,958,197 A | 9/1999 | Allen et al. |
| 6,387,345 B1 | 5/2002 | Gestermann et al. |
| 6,402,930 B1 | 6/2002 | Allen et al. |
| 6,719,957 B2 | 4/2004 | Brady, Jr. et al. |
| 6,790,339 B2 | 9/2004 | Bulan et al. |
| 6,841,047 B2 | 1/2005 | Gestermann et al. |
| 6,852,667 B2 | 2/2005 | Hibi et al. |
| 6,916,953 B2 | 7/2005 | Walsdorff et al. |
| 7,128,824 B2 | 10/2006 | Bulan et al. |
| 7,211,177 B2 | 5/2007 | Gestermann et al. |
| 2003/0173211 A1 | 9/2003 | Gestermann et al. |
| 2004/0024244 A1* | 2/2004 | Walsdorff et al. ............ 560/347 |
| 2004/0069621 A1 | 4/2004 | Gestermann et al. |
| 2005/0077068 A1 | 4/2005 | Gestermann et al. |
| 2005/0118088 A1 | 6/2005 | Olbert et al. |
| 2005/0173257 A1 | 8/2005 | Bulan et al. |
| 2005/0279644 A1 | 12/2005 | Hashimoto et al. |
| 2006/0099138 A1 | 5/2006 | Walsdorff et al. |
| 2006/0249380 A1 | 11/2006 | Gestermann et al. |

FOREIGN PATENT DOCUMENTS

| | | |
|---|---|---|
| DE | 30 41 897 | 6/1982 |
| DE | 33 21 159 | 12/1984 |
| DE | 44 17 744 | 11/1995 |
| DE | 195 35 716 | 3/1997 |
| DE | 101 38 214 | 2/2003 |
| DE | 101 38 215 | 2/2003 |
| DE | 101 48 600 | 4/2003 |
| DE | 101 52 275 | 4/2003 |
| DE | 102 00 072 | 7/2003 |
| DE | 102 03 689 | 8/2003 |
| DE | 102 34 806 | 2/2004 |
| DE | 102 35 476 | 2/2004 |
| DE | 102 50 131 | 5/2004 |
| DE | 103 47 703 | 5/2005 |
| EP | 251 731 | 1/1988 |
| EP | 0 570 799 | 11/1993 |
| EP | 0 711 599 | 5/1996 |
| EP | 0 761 593 | 3/1997 |
| EP | 0 931 857 | 7/1999 |
| EP | 0 936 184 | 8/1999 |
| EP | 1 609 887 | 12/2005 |
| GB | 1004207 A * | 9/1965 ............... C25B 1/26 |
| GB | 1046313 | 10/1966 |
| JP | 59-73405 | 4/1984 |
| RU | 1801943 | 3/1993 |
| RU | 2 253 607 | 6/2005 |
| WO | WO-85/03571 | 8/1985 |
| WO | WO-96/16028 | 5/1996 |
| WO | WO-00/73538 | 12/2000 |
| WO | WO-03/072237 | 9/2003 |
| WO | WO-2005/012596 | 2/2005 |

OTHER PUBLICATIONS

P. Schmittinger, "Membrane Process," *Chlorine* (2000), pp. 77-107, Wiley-VCH Verlag.

* cited by examiner

PROCESSES FOR THE PRODUCTION OF CHLORINE FROM HYDROGEN CHLORIDE AND OXYGEN

BACKGROUND OF THE INVENTION

Hydrogen chloride occurs as a by-product in the production of a plurality of chemical reactions with chlorine and or phosgene, for example the production of isocyanates or the chlorination of aromatic compounds. Hydrogen chloride can be converted by electrolysis or by oxidation with oxygen to chlorine, which can then be used again in such chemical reactions. The oxidation of hydrogen chloride (HCl) to chlorine ($Cl_2$) takes place by reaction of hydrogen chloride and oxygen ($O_2$) according to the following equation:

$$4HCl+O_2 \leftrightarrow 2Cl_2+2H_2O$$

The reaction can be carried out in the presence of catalysts at a temperature of approximately 250 to 450° C. The normal reaction pressure is in the range of 1 to 10 bar. Such processes, generally referred to collectively as "Deacon processes", are known, and include: Shell-Chlor process, MT-Chlor process, KEL-Chlor process, Carrier Catalyst process and Sumitomo-Chlor process.

Suitable catalysts for a Deacon process include transition metal compounds such as copper and ruthenium compounds or even compounds of other noble metals such as gold and palladium. Such catalysts are described for example in DE 1567788 A1, EP 251731 A2, EP 936184 A2, EP 761593 A1, EP 711599 A1 and DE 10250131 A1, the entire contents of each of which are hereby incorporated herein by reference. Such catalysts can normally be applied to a support material. Suitable support materials include, for example, silicon dioxide, aluminium oxide, titanium dioxide and/or zirconium oxide.

The Deacon processes are regularly carried out in fluid-bed reactors or fixed-bed reactors, e.g., in multi-tube reactors. Hydrogen chloride is freed of impurities before the reaction with oxygen in order to avoid poisoning of the catalysts used.

Alternatively, processes in which the reaction of hydrogen chloride with oxygen is non-thermally activated, are known. Such processes are described in the literature. "Non-thermally activated" reactions include, but are not limited to, excitations of the reaction with, for example, any one or more of the following: energy radiation, e.g., laser radiation, photochemical radiation sources, UV radiation, infrared radiation, etc.; a low-temperature plasma, e.g., created by electrical discharge; magnetic field excitation; tribomechanical activation, e.g., excitation by shock waves; ionising radiation, e.g., gamma-ray and X-ray radiation, α- and β-rays from nuclear disintegration, high-energy electrons, protons, neutrons and heavy ions; and microwave irradiation.

Oxygen is normally used in both the thermal and non-thermal activated reaction of hydrogen chloride as a pure gas with an $O_2$ content of >98 vol. %.

The reaction of hydrogen chloride with oxygen is known to produce a gas mixture which, in addition to the target product chlorine, can also contains water, unreacted hydrogen chloride and unreacted oxygen, along with other secondary constituents such as carbon dioxide. To obtain pure chlorine, the product gas mixture is cooled until reaction water and hydrogen chloride condense out in the form of concentrated hydrochloric acid. The hydrochloric acid formed is then separated from the remaining gaseous reaction mixture. Residual water can then be removed from the gas mixture by washing with sulfuric acid or other methods such as drying with zeolites.

The hydrochloric acid separated from the gas mixture is normally then fed to a desorption stage in which gaseous hydrogen chloride is again released. This gaseous hydrogen chloride can be partially or preferably completely returned to the reaction of hydrogen chloride with oxygen. The dilute hydrochloric acid occurring in the desorption stage can be returned to the hydrochloric acid condensation stage. Here the dilute hydrochloric acid serves as an absorbing agent for the gaseous hydrogen chloride to be separated off. A procedure of this type is generally described, for example, in DE 10235476 A1. Alternatively, the hydrochloric acid separated from the gas mixture can also be fed to recycling.

The chlorine-containing reaction gas mixture freed of residual water is then compressed, wherein the unreacted oxygen and other secondary gas constituents can remain in the gas phase, and thus be separated from the liquefied (compressed) chlorine. Processes of this type for obtaining pure chlorine from gas mixtures are described for example in DE 19535716 A1 and DE 10235476 A1, the entire contents of each of which are hereby incorporated herein by reference. The purified chlorine can then be fed, for example, to a process for the production of isocyanates.

A substantial disadvantage of these processes is the relatively high expenditure of energy required for the desorption of hydrogen chloride from the hydrochloric acid during the purification of the chlorine gas stream after the reaction. Additionally, the recycling of the hydrochloric acid in such processes is not generally economic.

SUMMARY OF THE INVENTION

It has now been found that such disadvantages can be overcome where residual hydrogen chloride in the form of an aqueous solution of hydrochloric acid, formed during subsequent treatment of a chlorine product gas stream from a reaction of hydrogen chloride and oxygen, is fed to an electrochemical oxidation in which at least part of the hydrochloric acid is oxidized to chlorine.

The invention relates, in general, to processes for the production of chlorine (e.g., by thermal reaction of hydrogen chloride with oxygen using catalysts and/or by non-thermal activated reaction of hydrogen chloride with oxygen), in which the gas mixture formed by the reaction, which contains at least chorine, water, unreacted (residual) hydrogen chloride and unreacted (residual) oxygen, is cooled to form an aqueous solution of hydrochloric acid, and the aqueous solution is separated from the gas mixture and subjected to electrochemical oxidation to form chlorine. The invention also relates to the incorporation of such processes into other HCl oxidation processes and other chlorine processes.

One embodiment of the present invention includes a process comprising: reacting hydrogen chloride and oxygen to form a gas mixture comprising chlorine, water, residual hydrogen chloride, and residual oxygen; cooling the gas mixture to form an aqueous solution of hydrogen chloride; and separating the aqueous solution of hydrogen chloride from the gas mixture, wherein at least a portion of the separated aqueous solution is subjected to electrochemical oxidation to form additional chlorine.

Various preferred embodiments of the invention include such processes described in the embodiment above, wherein the additional chlorine is introduced back into the gas mixture. Various preferred embodiments of the invention can also include such processes (with and without introduction of the additional chlorine back into the gas mixture) wherein at least a portion of the water remaining in the gas mixture after cooling and separation is removed, and/or at least a portion of the oxygen from the gas mixture is removed.

BRIEF DESCRIPTION OF THE SEVERAL VIEWS OF THE DRAWING

The foregoing summary, as well as the following detailed description of the invention, will be better understood when read in conjunction with the appended drawings. For the purpose of illustrating the invention, there is shown in the drawing an embodiment which is presently preferred. It should be understood, however, that the invention is not limited to the precise arrangements and instrumentalities shown.

In the Fig..

DETAILED DESCRIPTION OF THE INVENTION

As used herein, the singular terms "a" and "the" are synonymous and used interchangeably with "one or more" or "at least one." Accordingly, for example, reference to "a gas" herein or in the appended claims can refer to a single gas or more than one gas. Additionally, all numerical values, unless otherwise specifically noted, are understood to be modified by the word "about."

Processes in accordance with the various embodiments of the present invention are preferably carried out continuously. While batch and/or semi-batch operations are possible and included within the scope of the present invention, continuous operation is preferable as batch and semi-batch operation can be somewhat more costly than a continuous process.

In various preferred embodiments of the processes according to the invention, hydrogen chloride is separated completely from the gas mixture as the aqueous solution of hydrochloric acid. Separation of the hydrogen chloride from the gas mixture in accordance with various embodiments of the invention includes cooling the gas mixture to condense the hydrogen chloride and water as the aqueous solution, and can preferably further include washing of the gas mixture with liquids such as water or dilute hydrochloric acid, preferably water.

Electrochemical oxidation of the aqueous solution of hydrochloric acid in accordance with various embodiments of the invention can preferably be carried out via a membrane electrolysis process and/or via a diaphragm electrolysis process. A variety of electrolysis devices can be employed. Preferably, electrochemical oxidation can be carried out in a two-chamber electrolysis cell having an anode chamber and a cathode chamber, or in a three-chamber electrolysis cell having an anode chamber, cathode chamber and an electrolyte chamber between the anode and cathode chamber. More preferably, a two-chamber electrolysis cell is used.

In a membrane process, the anode chamber is separated from the cathode chamber by an ion exchange membrane (hereafter referred to as "a membrane"), and more preferably, a cation exchange membrane. In a diaphragm process, the cathode and anode chambers are separated by a diaphragm. The distance of the electrodes (anode and cathode) from the diaphragm or the membrane can preferably be 0 to 3 mm, more preferably 0 to 2 mm. Suitable ion exchange membranes including, but not limited to, e.g., single-layer ion exchange membranes with sulfonic acid groups, are commercially available. Examples of suitable, commercially available ion exchange membranes include the Nafion® 324 and Nafion® 117 type membranes available from DuPont.

Suitable diaphragms which can be used in accordance with diaphragm electrolysis include wovens, such as, for example, woven diaphragms described in German Patent Publication No. DE3321159A1, the entire contents of which are hereby incorporated herein by reference. Suitable woven diaphragms can comprise threads made of plastic. Thus, for example, fabrics made of polyvinyl chloride (PVC) and/or polyvinylidene fluoride (PVDF) fibers/threads can be used. Suitable fabrics can include warps and/or wefts which can include both monofilament threads and/or multifilament threads, such as, for example, as described in DE3321159A1. Woven fabrics suitable for use as a diaphragm can be compressed to optimise the gas permeability, e.g., by calendering.

Electrodes based on graphite can be used in suitable electrolysis devices for the electrochemical oxidation of hydrochloric acid in accordance with various embodiments of the invention including both diaphragm processes and membrane processes, and more preferably, the anode and/or the cathode consist essentially of graphite. Bipolar electrodes made of graphite are particularly preferably used. Certain particularly advantageous embodiments include electrodes, and more preferably in particular anodes, comprised of graphite which have a coating on their surface comprising a noble metal, for example, iridium, such as described, e.g., in German Patent Publication No. DE4417744A1, the entire contents of which are hereby incorporated herein by reference.

Graphite electrodes can have a variety of geometric shapes, such as are described, e.g., in German Patent Publication No. DE3041897A, the entire contents of which are hereby incorporated herein by reference. Anodes and cathodes preferably have a similar structure. Suitable geometric shapes for anodes and/or cathodes preferably include vertically arranged grooves, flutes, notches, depressions or similar surface topography. Such grooves, etc. can serve to help direct the upward movement of gas forming during electrolysis, i.e., chlorine and hydrogen, from the narrow gap between the respective electrode and the diaphragm or the membrane, e.g., in cells with a technical height of about 0.1 m to 2 m, preferably 0.6 to 1.4 m. Particularly preferably such grooves, etc. can have a depth of 5 to 35 mm, very particularly preferably 15 to 25 mm and a width of preferably 1 to 5 mm. The distance between two adjacent grooves, etc., which are preferably substantially parallel to one another, is preferably 4 to 6 mm. In additional other suitable embodiments of electrodes having grooves, etc., the depth and/or width of the grooves vary along their length. Thus, the depth of the grooves, for example, can be 12 to 15 mm at the lower end of the grooves and 20 to 30 mm at the upper end of the grooves.

In certain preferred embodiments of the present invention, electrochemical oxidation of the aqueous solution of hydrochloric acid is carried out using a diaphragm electrolysis process wherein the hydrochloric acid solution serves as an electrolyte both in the anode chamber and in the cathode chamber. During such electrolysis, chlorine is produced on the anode and hydrogen on the cathode.

In certain preferred embodiments of the present invention, electrochemical oxidation of the aqueous solution of hydrochloric acid includes development of hydrogen cathodically, wherein one or more metal ions selected from the platinum group of metals, preferably platinum and/or palladium, are added to the hydrochloric acid in the cathode chamber. Thus, for example, solutions of hexachloroplatinic (IV) acid ($H_2PtCl_6$) or solutions of disodium tetrachloropalladate (II) $Na_2PdCl_4$) or even mixtures thereof are added to the cathode chamber. Addition can take place continuously or discontinuously. The addition of metal ions to the hydrochloric acid in the cathode chamber can help to maintain a low electrolysis voltage in the range of 1.6 to 2.1 V, compared with 2.2 to 2.3 V without addition of metal ions, e.g., at 5 kA/m$^2$, 70 to 80° C. and a hydrochloric acid content of 15 to 25%. A quantity of metal ions which is sufficient to maintain the electrolysis voltage in the range of 1.8 to 2.1 is preferably added. Maintenance of the electrolysis voltage during operation can include increasing the addition of metal ions as the electrolysis voltage rises during operation. Thus, addition can be carried out in discrete amounts once or several times, and may also be metered variably in response to operation conditions.

Electrochemical oxidation of the aqueous solution of hydrochloric acid in accordance with various embodiments of the invention can preferably be carried out at a temperature of 50 to 90° C. The concentration of the aqueous solution of hydrogen chloride to be used in electrolysis can preferably be 10 to 25 wt. %. In a diaphragm processes, a hydrochloric acid concentration of 12 to 20 wt. % is particularly preferred. Electrolysis with a diaphragm electrolysis device can preferably be carried out at an absolute pressure of approximately 1 bar, or even at higher pressures of up to about 2 bar, taking into consideration differential pressure between anode and cathode chamber. Even higher pressures are generally possible but require a correspondingly higher expenditure in the construction of the electrolysis cell. The differential pressure between anode chamber and cathode chamber is preferably 0 to 10 mbar, particularly preferably 1 to 2 mbar, in an effort to cause chlorine gas formed on the higher pressure anode side of the diaphragm to pass to the cathode side and thus be available to mix with the cathodically formed hydrogen.

In other various embodiments of the invention, electrochemical oxidation of the aqueous solution of hydrochloric acid is carried out using a membrane electrolysis process employing a gas diffusion electrode as the cathode. A suitable electrolysis cell can have either two chambers or three chambers, but preferably two chambers. An oxygen-containing gas, e.g., oxygen, air or air enriched with oxygen, is fed to the cathode half-cell. The oxygen is reduced on the gas diffusion electrode, water being formed. The aqueous hydrogen chloride solution is fed to the anode half-cell, the hydrogen chloride being oxidised to chlorine on the anode. The anode half-cell and the cathode half-cell are separated from one another by a cation exchange membrane. The electrolysis of hydrochloric acid using a gas diffusion electrode as the cathode is described, e.g., in WO 00/73538 A1, the entire contents of which are hereby incorporated herein by reference. A gas diffusion electrode is particularly preferably based at least on an electrically conductive fabric, woven, knitted fabric, net or nonwoven comprising carbon which is arranged between a carbon-containing catalyst layer and a gas diffusion layer.

Suitable membrane electrolysis cells can preferably include either a non-metallic material according to DE10347703A1, the entire contents of which are hereby incorporated herein by reference, or a metallic material. Titanium or a titanium alloy particularly such as a titanium-palladium alloy for example is suitable as a metallic material for the electrolysis cell. The half-shells for the anode and cathode half-cell, the current distributor and the current feeds are thereby manufactured from titanium or a titanium alloy.

The anode can be preferably designed according to, e.g., DE10234806A1, the entire contents of which are hereby incorporated herein by reference, with a gas lead-off construction. Such anodes can comprise a metal, preferably titanium, with a coating of noble metal oxide, e.g., of ruthenium oxide. Furthermore, another suitable anode comprising titanium, such as described in, e.g., DE 10200072 A1, the entire contents of which are hereby incorporated herein by reference, can have an intermediate layer of titanium carbide or titanium boride which is applied to the titanium anode by means of plasma or flame spraying before the coating of a noble metal oxide is applied. Additional suitable metal anodes have openings for the passage of the gas formed during electrolysis, the openings having preferably guide structures which lead off the gas formed to the side of the metal anode turned away from the ion exchange membrane, such as described in DE 10234806 A1. The total cross-sectional area of the openings is preferably in the range of 20% to 70% of the area which is formed by the height and width of the anode. The metal anode can in addition have a wavy, zigzag or rectangular cross-section. The depth of the anode should thereby be at least 1 mm. The ratio of electrochemically active area of the metal anode to the area which is formed by the height and width of the metal electrode should be at least 1.2. In another embodiment, the metal anode can comprise two adjacent expanded metals, the expanded metal showing to the ion exchange membrane being more finely structured than the expanded metal turning away from the ion exchange membrane. Furthermore, the finer-structured expanded metal is thereby rolled flat and the coarser-structured expanded metal arranged so that the mesh webs are inclined in the direction of the cathode and serve as guide structures. Alternatively, the anode can also include an expanded metal. In principle, the anode should have a free area of 15 to 70%. The thickness of the expanded metals should be selected so that no additional electrical resistance with a bipolar switching of the individual electrolysis cells (cell element) to an electrolyser occurs. The electrical resistance depends substantially on the electrical contacting of the anode, such as for example number of current feed connection elements between the anode and back wall of the anode half-cell.

During electrolysis by means of a gas diffusion electrode, the anode chamber and the cathode chamber can be separated by an ion exchange membrane. DuPont ion exchange membranes of the Nafion® 324 or Nafion® 117 type, for example, can be used. A membrane which, as described, e.g., in WO 05/12596 A1, the entire contents of which are hereby incorporated herein by reference, has a smooth surface structure on the side of the membrane facing the gas diffusion electrode, is preferably used. The smooth surface structure of the membrane can enable the gas diffusion electrode and the membrane to be adjacent in such a way that at a pressure of 250 g/cm$^2$ and a temperature of 60° C. the contact area is at least 50% of the geometric area of the membrane.

A cathodic current distributor, to which the gas diffusion electrode can be connected, is preferably one according to German Patent Publication No. DE10203689A1, the entire contents of which are hereby incorporated herein by reference. Such a distributor has a free area of less than 65%, but more than 5%. The thickness of the current distributor is preferably at least 0.3 mm. It can include an expanded metal, net, fabric, foam, nonwoven, and/or a slotted sheet or perforated plate of metal. The cathodic current distributor preferably includes an expanded metal with a mesh length of 4 to 8 mm, a mesh width of 3 to 5 mm, a web width of 0.4 to 1.8 mm and a thickness of 0.4 to 2 mm. In addition, the cathodic current distributor can have a second expanded metal as a support for the first expanded metal. The second expanded metal as support preferably has a mesh length of 10 to 40 mm, a mesh width of 5 to 15 mm, a web width of 2 to 5 mm and a thickness of 0.8 to 4 mm. A net which preferably has a wire thickness of 1 to 4 mm and a mesh width of 7 to 25 mm can also be used as a support. Furthermore, a perforated sheet or slotted sheet which preferably has an open area of less than 60% and a thickness of 1 to 4 mm can furthermore be used as a support. For example, titanium or a noble metal-containing titanium alloy, such as e.g., titanium-palladium, can be used as a material for the cathodic current distributor. If the current distributor is an expanded metal, this is preferably rolled.

A commercial gas diffusion electrode which is fitted with a suitable catalyst can be used as the gas diffusion electrode. Suitable catalysts include rhodium and/or at least one rhodium sulfide or a mixture of rhodium and at least one rhodium sulfide, such as described in, e.g., WO 00/73538A1, the entire contents of which are hereby incorporated herein by reference. Rhodium and/or rhodium oxide or mixtures thereof can also be used, such as described in EP 931857 A1, the entire contents of which are hereby incorporated herein by reference. The gas diffusion electrode preferably includes an electrically conductive fabric, paper or nonwoven made of carbon, the fabric, paper or nonwoven having on one side a carbon-containing catalyst layer and on the other side a gas diffusion layer. The catalyst is preferably applied to a support, preferably made of carbon, polytetrafluoroethylene particles being integrated which are coupled to the support structure. The gas diffusion layer preferably includes carbon and polytetrafluoroethylene particles in which, for example, the ratio of carbon to PTFE is 50:50. The gas diffusion electrode can for example be arranged so that it is not firmly connected to the ion exchange membrane. Contacting of the gas diffusion electrode to the current distributor and the ion exchange membrane takes place preferably by pressure contact, i.e., the gas diffusion electrode, the current distributor and the membrane are pressed together. The gas diffusion electrode can be connected to the current collector, such as described in DE 10148600 A1, the entire contents of which are hereby incorporated herein by reference.

In various embodiments of the present invention, electrochemical oxidation of hydrochloric acid via a membrane electrolysis process with a gas diffusion electrode is preferably carried out at a temperature of 40 to 70° C. The concentration of the aqueous solution of hydrogen chloride in the anode chamber can be 10 to 20 wt. %, preferably 12 to 17 wt. %. The cell can be operated, for example, so that the pressure in the anode chamber is higher than the pressure in the cathode chamber. The cation exchange membrane can be pressed on to the gas diffusion electrode and this in turn on a current distributor. Alternatively, a construction of the electrolysis cell which is described in DE 10138214 A1 can be used, the entire contents of which are hereby incorporated herein by reference. The anode and/or current distributor can be stored elastically, for example in that they are connected by means of springs to the back wall of the respective "half-cell". When assembling the cell, a "zero gap" arrangement is produced where the anode is in direct contact with the ion exchange membrane, this in turn in direct contact with the gas diffusion electrode and this in turn indirect contact with the current distributor. The elastic storage causes the anode, membrane, gas diffusion electrode and current distributor to press together.

In a particularly preferred embodiment of the electrolysis process, the anode half-element can be filled with a 5 to 20 wt. % hydrochloric acid when the electrolysis cell is started such as described in DE 10152275 A1, the entire contents of which are hereby incorporated herein by reference, the hydrochloric acid containing at least 10 ppm free chlorine. The volumetric flow rate of the hydrochloric acid through the anode chamber is set so that at the beginning of electrolysis the hydrochloric acid flows at a rate in the anode chamber of 0.05 to 0.15 cm/s. Electrolysis is started at a current density of 0.5 to 2 $kA/m^2$ and increased by 0.5 to 1.5 $kA/m^2$ at a time at intervals of 5 to 25 minutes. After a given current density of preferably 4 to 7 $kA/m^2$ is achieved, the volumetric flow rate of the hydrochloric acid is set so that the hydrochloric acid in the anode half-element flows at a rate of 0.2 to 0.4 cm/s.

A particularly advantageous mode of operation of an electrolysis cell can include operation at an elevated pressure in the cathode chamber to lower the cell voltage, such as described in DE 10138215 A1, the entire contents of which are hereby incorporated herein by reference. The differential pressure between anode chamber and cathode chamber should be 0.01 to 1000 bar and the oxygen pressure in the cathode chamber at least 1.05 bar absolute.

In various preferred embodiments of the invention, the aqueous solution of hydrochloric acid can be oxidized together with alkali chlorides, in particular with sodium chloride, in an anodic alkali chloride electrolysis.

Suitable anodic alkali chloride electrolysis is described in more detail as follows. Normally, membrane electrolysis processes are used for the electrolysis of sodium chloride-containing solutions (see also, e.g., Peter Schmittinger, CHLORINE, Wiley-VCH Verlag, 2000, page 77 ff). A two-part electrolysis cell which includes an anode chamber with an anode, and a cathode chamber with a cathode, is preferably used. Anode and cathode chambers are separated by an ion exchange membrane. Commercially available ion exchange membranes such as, e.g., Nafion® 982 from DUPONT, can be used. A sodium chloride-containing solution with a sodium chloride concentration of normally approx. 300 g/l is introduced into the anode chamber having a titanium, a noble metal-coated titanium or a noble metal oxide-coated titanium anode. The chloride ion is oxidised on the anode to chlorine which is taken from the cell with the depleted sodium chloride-containing solution (approx. 200 g/l). The sodium ions migrate under the influence of the electrical field through the ion exchange membrane into the cathode chamber. During this migration, each mole of sodium takes with it, depending on the membrane, between 3.5 and 4.5 moles water. This leads to the anolyte becoming low in water. In contrast to the anolyte, on the cathode side water is consumed by the electrolysis of water to hydroxide ions. The water passing with the sodium ions into the catholyte is sufficient to maintain the sodium hydroxide solution concentration in the discharge at 31-32 wt. %; this applies at a NaOH inlet concentration of 30% and a current density of 4 $kA/m^2$. Water is electrochemically reduced in the cathode chamber, hydroxide ions and hydrogen being formed.

Alternatively, a gas diffusion electrode on which oxygen is reacted with electrons to hydroxide ions, can also be used as cathode, no hydrogen being formed. The hydroxide ions form sodium hydroxide solution with the sodium ions passing via the ion exchange membrane into the cathode chamber. A sodium hydroxide solution with a concentration of 30 wt. % is normally fed into the cathode chamber and a sodium hydroxide solution with a concentration of 31-32 wt. % taken off.

In order to feed maximum quantities of sodium chloride-containing solutions economically to sodium chloride electrolysis, it is necessary that the water transport via the membrane is increased. This can be done by selecting suitable membranes, such as described e.g., in U.S. Pat. No. 4,025,405, the entire contents of which are hereby incorporated herein by reference. The effect of an increased water transport is that the otherwise normal water addition is not needed to maintain the caustic solution concentration. Suitable operating conditions for electrolysis include a pH range of 1 to 5, a temperature of 35-100° C. and a sodium chloride concentration of 100-325 g/l.

Electrolysis can be operated with a higher current yield at higher water transport through the membrane if a caustic solution concentration of 31-34 wt. %, particularly preferably 36-38 wt. % and a sodium chloride concentration of 120-250 g/l is used, such as described in U.S. Pat. No. 3,773,634, the entire contents of which are hereby incorporated herein by reference.

A further alternative is the use of a modified cell design according to EP 1609887, the entire contents of which are hereby incorporated herein by reference. Here the electrolysis cell is modified so that the distance between membrane and anode which is normally zero, i.e., the membrane lies on the anode, is increased. This has the disadvantage that the use can only take place using a new electrolysis cell with adapted design or by converting existing electrolysis cells to the new design which is linked to high investment. With existing plants, this process concept may not be economically practicable.

Processes according to various embodiments of the invention can produce a chlorine gas which can be used in chemical synthesis, such as, for example, the production of isocyanates. The chlorine gas produced is preferably highly pure and suitable for use in a wide variety of processes.

Additional embodiments of the invention include processes in which the hydrogen chloride used as a starting material for oxidative reaction with oxygen is itself a product of a production process for isocyanates. Additional embodiments also include the subsequent use of chlorine gas produced by a process in accordance with the invention after removing remaining water and oxygen, in the production of isocyanates. In certain particularly preferred embodiments, the hydrogen chloride used as a starting material for oxidative reaction with oxygen is itself a product of a production process for isocyanates and chlorine gas produced by the process in such embodiments is recycled to that same isocyanate production process.

Initially, in a preferred process that includes the integration of the inventive chlorine production process into an isocyanate production, the production of phosgene is carried out by reacting chlorine with carbon monoxide. The synthesis of phosgene is sufficiently known and is described e.g., in Ullmanns Enzyklopädie der industriellen Chemie, 3$^{rd}$ edition, volume 13, pages 494-500. Phosgene is produced on an industrial scale predominately by reacting carbon monoxide with chlorine preferably on activated carbon as catalyst. The strongly exothermic gas phase reaction takes place typically at a temperature of minimum 250° C. to maximum 600° C. as a rule in multi-tube reactors. Taking off the heat of reaction can take place in a different way, for example by a liquid heat exchange agent, as described e.g., in specification WO 03/072237 A1, or by hot cooling via a secondary cooling cycle with simultaneous use of the heat of reaction to produce vapour, as disclosed e.g., in U.S. Pat. No. 4,764,308.

At least one isocyanate is formed from the phosgene by reaction with at least one organic amine or a mixture of two or more amines in a next process step. This reaction is designated "phosgenation" in the following. The reaction takes place with formation of hydrogen chloride as a by-product which occurs as a mixture with the isocyanate.

The synthesis of isocyanates is likewise known in principle from the prior art, phosgene as a rule being used in a stoichiometric excess based on the amine. Phosgenation normally takes place accordingly in the liquid phase, wherein the phosgene and the amine can be dissolved in a solvent. Preferred solvents for phosgenation are chlorinated aromatic hydrocarbons such as chlorobenzene, o-dichlorobenzene, p-dichlorobenzene, trichlorobenzene, the corresponding chlorotoluenes or chloroxylenes, chloroethylbenzene, monochlorodiphenyl, α- or β-naphthyl chloride, benzoic acid ethyl esters, phthalic acid dialkyl esters, diisodiethyl phthalate, toluene and xylenes. Further examples of suitable solvents are in principle known from the prior art. As also known from the prior art, e.g., according to specification WO 96/16028, the isocyanate formed can likewise function as solvent for phosgene. In another, preferred embodiment, phosgenation, in particular of suitable aromatic and aliphatic diamines, takes place in the gas phase, i.e., above the boiling point of the amine. The gas phase phosgenation is described e.g., in EP 570799 A1. Advantages of this process over the otherwise normal liquid phase phosgenation lie in energy saving caused by the minimisation of a costly solvent and phosgene cycle.

All primary amines with one or more primary amino groups which can react with phosgene forming one or more isocyanates with one or more isocyanate groups, are in principle suitable as organic amines. The amines have at least one, preferably two, or optionally three and more primary amino groups. Aliphatic, cycloaliphatic, aliphatic-aromatic, aromatic amines, di- and/or polyamines, such as aniline, halogen-substituted phenyl amines, e.g., 4-chlorophenylamine, 1,6-diaminohexane, 1-amino-3,3,5-trimethyl-5-amino cyclohexane, 2,4-, 2,6-diaminotoluene or mixtures thereof, 4,4'-, 2,4'- or 2,2'-diphenylmethane diamine or mixtures thereof, and also higher-molecular isomer, oligomer or polymer derivatives of the named amines and polyamines, are thus possible as organic primary amines. Other possible amines are known in principle from the prior art. Preferred amines for the present invention are the amines of the diphenyl methane diamine range (monomer, oligomer and polymer amines), 2,4'-, 2,6'-diaminotoluene, isophorone diamine and hexamethylenediamine. The corresponding isocyanates diisocyanatodiphenylmethane (MDI, monomer, oligomer and polymer derivatives), toluylene diisocyanate (TDI), hexamethylene diisocyanate (HDI) and isophorone diisocyanate (IPDI) are obtained during phosgenation.

The amines can be reacted with phosgene in a one-stage or two-stage or optionally multi-stage reaction. A continuous and also discontinuous mode of operation is thereby possible.

If a single-stage phosgenation in the gas phase is selected, the reaction takes place above the boiling point of the amine preferably within an average contact time of 0.5 to 5 seconds and at a temperature of 200 to 600° C.

Phosgenation in the liquid phase is normally carried out at a temperature of 20 to 240° C. and a pressure of 1 to approx.

50 bar. Phosgenation in the liquid phase can be carried out in a single stage or in multiple stages, wherein phosgene can be used in stoichiometric excess. The amine solution and the phosgene solution are thereby combined via a static mixing element and then passed for example from bottom to top through one or more reaction towers where the mixture reacts out to the required isocyanate. In addition to reaction towers which are provided with suitable mixing elements, reaction vessels with stirring device can also be used. Apart from static mixing elements, special dynamic mixing elements can also be used. Suitable static and dynamic mixing elements are in principle known from the prior art.

As a rule, the continuous liquid phase isocyanate production is carried out on an industrial scale in two stages. In the first stage carbamoyl chloride is formed from amine and phosgene and amine hydrochloride from amine and split off hydrogen chloride in general at a temperature of maximum 220° C., preferably maximum 160° C. This first stage is strongly exothermic. In the second stage, both the carbamoyl chloride is split to isocyanate and hydrogen chloride and the amine hydrochloride reacted to the carbamoyl chloride. The second stage is carried out as a rule at a temperature of at least 90° C., preferably 100 to 240° C.

After phosgenation, separation of the isocyanates formed during phosgenation is carried out. This can be carried out by first separating the phosgenation reaction mixture into a liquid and a gaseous product stream in a way known in principle to the skilled person. The liquid product stream contains substantially the isocyanate or isocyanate mixture, the solvent and a small part of unreacted phosgene. The gaseous product stream consists substantially of hydrogen chloride gas, stoichiometrically excess phosgene, and small quantities of solvent and inert gases, such as for example nitrogen and carbon monoxide. Furthermore, the liquid stream is then fed to a processing, preferably a distillative processing, with phosgene and the solvent for phosgenation being separated off in succession. Optionally a further processing of the isocyanates formed also takes place. This occurs for example by fractionating the isocyanate product obtained in a way known to the skilled person.

The hydrogen chloride obtained in the reaction of phosgene with an organic amine in general contains organic secondary constituents which can interfere both in the thermal catalyzed or non-thermal activated HCl oxidation and in the electrochemical oxidation of an aqueous hydrogen chloride solution according to the various embodiments of the invention. These organic constituents include for example the solvents used in isocyanate production such as chlorobenzene, o-dichlorobenzene or p-dichlorobenzene. If a gas diffusion electrode is used as cathode during electrolysis, the catalyst of the gas diffusion electrode can also be deactivated by the organic impurities. In addition, these impurities can be deposited on the current collector and thereby impair the contact between gas diffusion electrode and current collector, resulting in an undesired rise in voltage. If the diaphragm process is used for electrolysis of the hydrochloric acid, the named organic constituents can be deposited on the graphite electrodes and/or diaphragm and thereby likewise increase the electrolysis voltage.

The separation of the hydrogen chloride produced during phosgenation from the gaseous product stream is thus preferably carried out. The gaseous product stream which is obtained during separation of the isocyanate is treated so that the phosgene can again be fed to phosgenation and the hydrogen chloride to an electrochemical oxidation.

The separation of the hydrogen chloride takes place preferably first by separating off phosgene from the gaseous product stream. Separation of the phosgene occurs by liquefaction of phosgene, for example on one or more series-connected condensers. Liquefaction takes place preferably at a temperature in the range of −15 to −40° C. as a function of the solvent used. In addition, parts of the solvent residues can be removed from the gaseous product stream by this deep cooling.

In addition or alternatively, the phosgene can be washed out from the gas stream with a cold solvent or solvent-phosgene mixture in one or more stages. The solvents chlorobenzene and o-dichlorobenzene already used in the phosgenation are for example suitable as solvent for this. The temperature of the solvent or the solvent-phosgene mixture for this is in the range of −15 to −46° C.

The phosgene separated off from the gaseous product stream can be again fed to phosgenation. The hydrogen chloride obtained after separation of the phosgene and part of the solvent residue can contain, in addition to the inert gases such as nitrogen and carbon monoxide, 0.1 to 1 wt. % solvent and 0.1 to 2 wt. % phosgene.

Optionally a purification of the hydrogen chloride then takes place to reduce the content of traces of solvent. This can take place for example by means of freezing, by passing the hydrogen chloride for example through one or more cold traps as a function of the physical properties of the solvent.

In a particularly preferred embodiment of the purification of the hydrogen chloride optionally provided, the hydrogen chloride stream flows through two series-connected heat exchangers, the solvent to be separated being frozen as a function of the fixed point for example at −40° C. The heat exchangers are preferably operated alternately, the gas current thawing the previously frozen solvent in the heat exchanger through which it has first flowed. The solvent can be used again for the production of a phosgene solution. In the downstream second heat exchanger which is treated with a normal heat exchange medium for refrigerators, e.g., a compound from the freon range, the gas is preferably cooled below the fixed point of the solvent so that this crystallises out. When the thawing and crystallisation procedures are complete, the gas stream and the coolant stream are switched so that the function of the heat exchangers is reversed. The hydrogen chloride-containing gas stream can be depleted in this way to preferably maximum 500 ppm, particularly preferably maximum 50 ppm, very particularly preferably to maximum 20 ppm solvent content.

Alternatively, purification of the hydrogen chloride can take place preferably in two series-connected heat exchangers, e.g., according to U.S. Pat. No. 6,719,957, the entire contents of which are hereby incorporated herein by reference. The hydrogen chloride is thereby preferably compressed at a pressure of 5 to 20 bar, preferably 10 to 15 bar, and the compressed gaseous hydrogen chloride fed to a first heat exchanger at a temperature of 20 to 60° C., preferably 30 to 50° C. In this, the hydrogen chloride is cooled with a cold hydrogen chloride with a temperature of −10 to −30° C. which comes from a second heat exchanger. Organic constituents which can be passed for disposal or recycling are thereby condensed. The hydrogen chloride passed into the first heat exchanger leaves this at a temperature of −20 to 0° C. and is cooled in the second heat exchanger to a temperature of −10 to −30° C. The condensate occurring in the second heat exchanger consists of further organic constituents and small quantities of hydrogen chloride. To avoid a loss of hydrogen chloride, the condensate discharging from the second heat exchanger is fed to a separation and evaporation unit. This can for example be a distillation column in which the hydrogen chloride is expelled from the condensate and is returned to the second heat exchanger. It is also possible to return the expelled hydrogen chloride to the first heat exchanger. The hydrogen chloride cooled in the second heat exchanger and freed from organic constituents is passed into the first heat exchanger at a temperature of −10 to −30° C. After heating to 10 to 30° C., the hydrogen chloride freed of organic constituents leaves the first heat exchanger.

In a likewise preferred alternative process, the optionally provided purification of the hydrogen chloride from organic impurities, such as solvent residues, takes place on activated carbon by means of adsorption. The hydrogen chloride is for example thereby passed over or through an activated carbon bed after removing excess phosgene at a pressure difference of 0 to 5 bar, preferably 0.2 and 2 bar. The flow rate and dwell time is thereby adapted in a way known to the skilled person to the content of impurities. The adsorption of organic impurities is likewise possible on other suitable adsorption agents, e.g., on zeolites.

In a further, also preferred, alternative process, a distillation of the hydrogen chloride can be provided for the optionally provided purification of the hydrogen chloride from phosgenation. This takes place after condensation of the gaseous hydrogen chloride from phosgenation. In the distillation of the condensed hydrogen chloride, the purified hydrogen chloride is removed as the overhead product of the distillation, distillation taking place at standard conditions of pressure, temperature etc for such a distillation known to the skilled person.

The hydrogen chloride separated off and optionally purified according to the process described above can then be fed to HCl oxidation with oxygen. This HCl oxidation can preferably be carried out according to a Deacon process.

As already described above, the catalytic process known as the Deacon process is preferably used. Hydrogen chloride can be oxidized with oxygen in an exothermic equilibrium reaction to chlorine, water vapour being produced. The reaction temperature is normally 150 to 500° C., the normal reaction pressure is 1 to 25 bar. Since this is an equilibrium reaction, it is expedient to work at the lowest temperatures at which the catalyst still has sufficient activity. Since there is no fear of selectivity losses, it can be economically advantageous to work at relatively high pressure and correspondingly at a longer dwell time compared to standard pressure.

Suitable preferred catalysts for the Deacon process include ruthenium oxide, ruthenium chloride or other ruthenium compounds on silicon dioxide, aluminium oxide, titanium dioxide or zirconium dioxide as support. Suitable catalysts can for example be obtained by applying ruthenium chloride to the support and subsequent drying or drying and calcining. Suitable catalysts can also include in addition to or in place of a ruthenium compound, compounds of other noble metals, for example gold, palladium, platinum, osmium, iridium, silver, copper or rhenium. Suitable catalysts can furthermore include chromium(III) oxide.

The catalytic hydrogen chloride oxidation can be carried out adiabatically or preferably isothermally or approximately isothermally, discontinuously, but preferably however continuously as a fluid-bed or fixed-bed process, preferably as a fixed-bed process, particularly preferably in multi-tube reactors on heterogeneous catalysts at a reactor temperature of 180 to 500° C., preferably 200 to 400° C., particularly preferably 220 to 350° C. and a pressure of 1 to 25 bar (1000 to 25000 hPa), preferably 1.2 to 20 bar, particularly preferably 1.5 to 17 bar and in particular 2.0 to 15 bar.

Normal reaction apparatus in which the catalytic hydrogen chloride oxidation is carried out are fixed-bed or fluid-bed reactors. The catalytic hydrogen chloride oxidation can preferably also be carried out in multiple stages.

Several, thus 2 to 10, preferably 2 to 6, particularly preferably 2 to 5, in particular 2 to 3, series-connected reactors with additional intermediate cooling can be used in the isothermal or approximately isothermal procedure. The oxygen can be added in full together with the hydrogen chloride before the first reactor or distributed over the various reactors. This series connection of individual reactors can also be combined in one apparatus.

A further preferred embodiment of a device suitable for the process consists of using a structured catalyst bed in which the catalyst activity increases in the direction of flow. Such a structuring of the catalyst bed can take place by different impregnation of the catalyst supports with activated material or by different dilution of the catalyst with an inert material. Rings, cylinders or pellets of titanium dioxide, zirconium dioxide or mixtures thereof, aluminium oxide, steatite, ceramic, glass, graphite or noble steel for example can be used as inert material. With the preferred use of catalyst shaped bodies, the inert material should have preferably similar external dimensions.

Shaped bodies with any shapes are suitable as catalyst shaped bodies; tablets, rings, cylinders, stars, cartwheels or pellets are preferred as the shape, particularly preferred are rings, cylinders or star strands.

In particular, ruthenium compounds or copper compounds on support materials which can also be doped, are suitable as heterogeneous catalysts; optionally doped ruthenium catalysts are preferred. Silicon dioxide, graphite, and titanium dioxide with a rutile or anatase structure, zirconium dioxide, aluminium oxide or mixtures thereof, preferably titanium dioxide, zirconium dioxide, aluminium oxide or mixtures thereof, particularly preferably γ- or δ-aluminium oxide or mixtures thereof, are suitable as support materials.

The copper or ruthenium support catalysts can be obtained for example by impregnating the support material with aqueous solutions of $CuCl_2$ or $RuCl_3$ and optionally a promoter for doping, preferably in the form of their chlorides. The shaping of the catalyst can take place after or preferably before impregnation of the support material.

Alkali metals such as lithium, sodium, potassium, rubidium and caesium, preferably lithium, sodium and potassium, particularly preferably potassium, alkaline-earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof, are suitable as promoters for doping the catalysts.

The shaped bodies can then be dried and optionally calcined at a temperature of 100 to 400° C., preferably 100 to 300° C. for example under a nitrogen, argon or air atmosphere. The shaped bodies are preferably first of all dried at 100 to 150° C. and then calcined at 200 to 400° C.

The reaction to hydrogen chloride in the single pass can be limited preferably to 15 to 90%, preferably 40 to 85%, particularly preferably 50 to 70%. Unreacted hydrogen chloride can be returned after separation partially or completely to the catalytic hydrogen chloride oxidation.

The heat of reaction of the catalytic hydrogen chloride oxidation can be used in an advantageous way to produce high-pressure water vapour. This can be used to operate a phosgenation reactor and or distillation columns, in particular isocyanate distillation columns.

Subsequent to the oxidation of hydrogen chloride with oxygen, the chlorine formed is separated off. The separation of chlorine can comprise several stages, namely the separation and optional return of unreacted hydrogen chloride from the product gas stream of the catalytic hydrogen chloride oxidation, the drying of the stream obtained containing substantially chlorine and oxygen and the separation of chlorine from the dried stream.

The separation of unreacted hydrogen chloride and of water vapour formed can be carried out, as described above, by cooling to condense aqueous hydrochloric acid from the product gas stream of the hydrogen chloride oxidation. Hydrogen chloride can be absorbed even in dilute hydrochloric acid or water.

Figure 1:
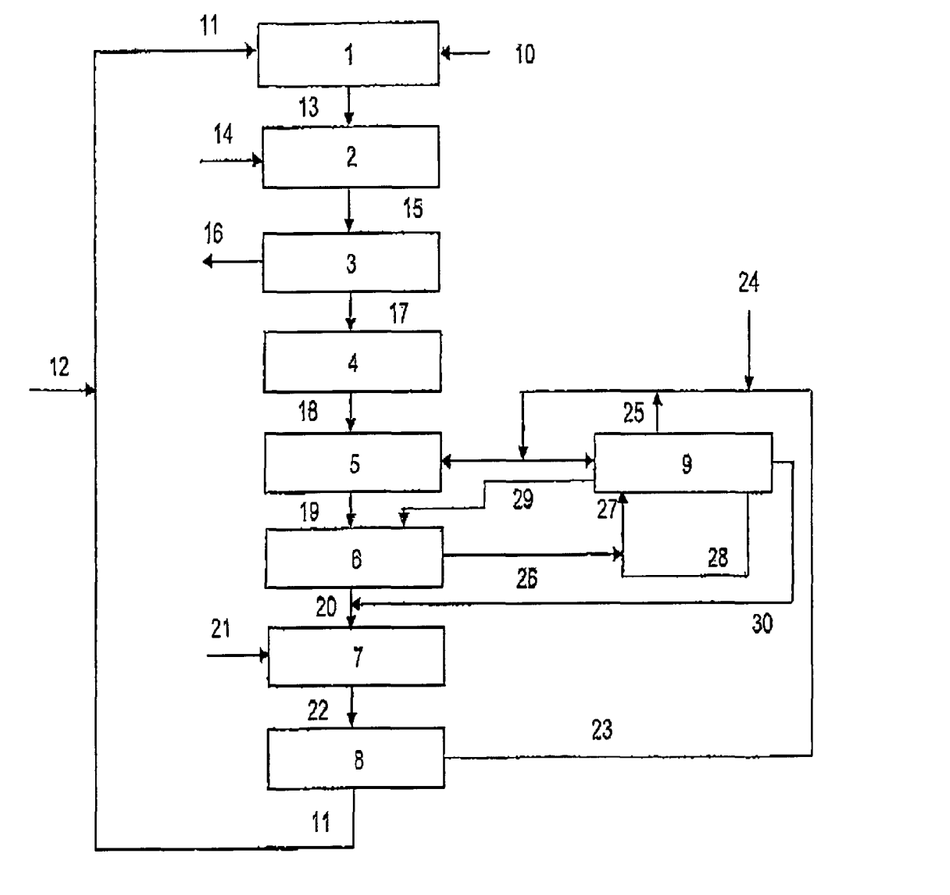
FIG. 1 is a flowchart representation of one embodiment of a process according to the present invention in an isocyanate production process.

A process according to one embodiment of the invention is illustrated, for example, in greater detail in FIG. 1, which depicts a flowchart for an integration of a process according to one embodiment into a process for the production of isocyanates.

Referring to FIG. 1, in a first stage 1 of the isocyanate production, chlorine 11 is reacted with carbon monoxide 10 to form phosgene 13. In the following stage 2, phosgene 13 from stage 1 is reacted with an amine 14 (e.g., toluene diamine) to a mixture 15 of isocyanate (e.g., toluene diisocyanate, TDI) and hydrogen chloride, the isocyanate 16 is separated off (in stage 3) and utilised and the HCl gas 17 subjected to a purification 4. The purified HCl gas 18 is reacted in the HCl oxidation process 5 with oxygen, here in a Deacon process by means of catalyst.

The reaction mixture 19 from stage 5 is cooled (step 6). Aqueous hydrochloric acid 26 which thereby occurs mixed optionally with water or dilute hydrochloric acid, is channeled out.

The gas mixture 20 thus obtained, consisting at least of chlorine, oxygen and secondary constituents such as nitrogen, carbon dioxide etc and [sic] is dried with conc. sulfuric acid 21 (96%) (step 7).

In a purification stage 8, chlorine 11 is separated from the gas mixture 22 from stage 7. The residual stream 23 having oxygen and secondary constituents is fed to electrolysis stage 9. The electrolysis stage is an ODC electrolysis in which on the cathode side oxygen is used as reactant.

The chlorine gas obtained from the purification stage 8 can be used again directly in the phosgene synthesis 1. The oxygen-containing stream 23 occurring in this step is used in step 5 (HCl oxidation) and step 9 (electrolysis cell).

The concentration of the hydrochloric acid 27 fed to the electrolysis cell 9 is 14 to 15 wt. % HCl, that of the hydrochloric acid 28 discharging from electrolysis 9 is 11 to 13 wt. % HCl. Concentrated hydrochloric acid 26 from the separation stage 6 is added to the hydrochloric acid stream 28 and again fed to cell 9.

The oxygen consumed in step 5 and step 9 is replaced by oxygen from an external source 24. The oxygen 25 not consumed in the cathode chamber of the electrolysis cell is passed in the cycle and fresh oxygen from an external source 24 added.

The approx. 2 wt. % hydrochloric acid stream 29 likewise occurring in the cathode chamber is fed to the hydrochloric acid separation 6 and serves there as absorption agent for excess gaseous hydrogen chloride.

The chlorine 30 produced according to step 9 is combined with the chlorine-containing gas stream 20.

The combined gas stream 30, 20 is cooled in a single- or multi-stage cooling by means of a cooling unit, e.g., a tubular heat exchanger, and dried. Drying 7 can take place for example by means of a suitable drying agent in an absorption column fitted with material exchange elements. A suitable drying agent can, as described e.g., in DE 10235476 A, be, in addition to molecular sieves or hygroscopic adsorbents, e.g., sulfuric acid. Drying can take place in a single or multiple stages. Drying preferably takes place in two stages, by the chlorine to be dried being brought into contact in a first stage with a sulfuric acid of lower concentration, preferably 70 to 80%, particularly preferably 75 to 80%. In a second stage, the residual moisture is removed from the chlorine by means of a higher-concentrated sulfuric acid of preferably 88 to 96%, particularly preferably 92-96%. The chlorine (22) dried in this way with a residual moisture of preferably maximum 100 ppm, particularly preferably maximum 20 ppm, can be passed through a droplet separator in order to optionally remove sulfuric acid droplets still contained therein.

The dried chlorine gas stream 22 is then subjected to a chlorine purification 8.

The following examples are for reference and do not limit the invention described herein.

EXAMPLES

Example 1

A stream of 35.9 t/h purified hydrogen chloride from an isocyanate plant is divided into two partial streams. 29.5 t/h are fed to a HCl oxidation and 6.4 t/h to a HCl absorption. 29.5 t/h HCl are fed with 12.9 t/h oxygen (content greater than 99%) of a catalytic HCl oxidation. Oxidation takes place at 333° C. and 3.4 bar. The HCl conversion in the reactor is 85%. The gas mixture leaving the reactor is cooled to 100° C., the HCl condensed with the reaction water in a HCl absorption. A partial stream of the hydrochloric acid-depleted anolytic acid stream 28 coming from electrolysis is introduced into the hydrochloric acid 26 from the HCl absorption. 32.1 t/h of the hydrochloric acid-depleted anolytic acid 28 with a HCl concentration of 12.2 wt. % is fed to HCl absorption. The cooled process gas stream (4.4 t/h HCl, 7.4 t/h oxygen, 24.4 t/h chlorine, 6.18 t/h water) is passed with 6.4 t/h purified hydrogen chloride into the HCl absorption. In this HCl absorption unit, a 30 wt. % hydrochloric acid 26 which is combined with the residue of the depleted anolytic acid 28 and again fed to the electrolysis cell, is produced. 2.96 t/h of the depleted anolytic acid 28 are channeled from the anolytic acid cycle (not shown).

Electrolysis is operated with a current density of 5 kA/m$^2$ at 55° C. and a voltage of 1.39 V. A palladium-stabilised titanium is used as the anode and cathode material. 10.1 t/h chlorine is developed on the ruthenium oxide-coated anode manufactured by DENORA, Germany. The anode and cathode half-shells are separated by an ion exchange membrane, type Nafion 324, manufactured by DUPONT. An oxygen depolarized cathode manufactured by ETEK which contains a rhodium sulfide-supported catalyst is used as the cathode. Oxygen is fed to the cathode half-element with 100% excess, i.e., at 9.17 t/h. The oxygen is recycled in the electrolysis, a purge stream of 1% of the feed quantity is led off behind electrolysis 9 (not shown) or used in HCl oxidation 5. The pressure in the anode half-cell is higher than that in the cathode half-cell. The differential pressure is 200 mbar. A condensate stream of 8.8 t/h is removed from the cathode half-cell.

The electrolysis unit 9 consists of 615 electrolysis cells, one element consisting of an anode half-shell with anode, an ion exchange membrane and a cathode half-shell with oxygen absorption cathode.

Example 2

As in Example 1, a purified HCl gas stream is fed at 35.9 t/h to the HCl oxidation with 100% oxygen excess, i.e., 15.7 t/h oxygen. The conversion is 85%, so that 5.4 t/h HCl, 9.0 t/h oxygen, 7.5 t/h water and 29.7 t/h chlorine leave the reactor. This process gas 19 is fed to a HCl absorption which is operated with a first partial stream of 177.8 t/h of a NaCl-depleted NaCl-containing solution (18.3 wt. % NaCl) coming from NaCl electrolysis. The water and hydrogen chloride of the process gas 19 is absorbed in this NaCl-containing solution. The stream leaving the absorption is composed as follows: 152.8 t/h water, 32.5 t/h NaCl, 5.4 t/h hydrogen chloride. This stream is then combined with the second partial stream of the NaCl-containing solution of 118.2 t/h, 26.4 t/h solid NaCl are added and it is again fed to the NaCl electrolysis. NaCl electrolysis consists of 1475 bipolar electrolysis elements per 2.71 $m^2$ membrane surface. NaCl electrolysis is operated with anode half-shells made of titanium which has a noble metal-coated titanium anode. The cathode half-shell consists of nickel and supports a noble metal oxide-coated nickel cathode. The anode and cathode half-shells are separated by an ion exchange membrane from Nafion 982 manufactured by DUPONT. 21.2 t/h chlorine are produced anodically, 74.8 t/h sodium hydroxide solution with a concentration of 32 wt. % and 0.6 t/h hydrogen cathodically. The NaCl-depleted anolyte is partially fed again to the HCl absorption.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:
1. A process comprising:
 a) dividing a stream of purified hydrogen chloride into a first partial stream and a second partial stream
 b) feeding the first partial stream to a catalytic oxidation, where hydrogen chloride and oxygen are reacted to form a gas mixture comprising chlorine, water, residual hydrogen chloride, and residual oxygen;
 c) cooling the gas mixture formed in step b) to form a cooled process gas stream
 d) feeding the cooled process gas stream into a hydrogen chloride absorption along with the second partial stream to produce an aqueous solution of hydrogen chloride; and
 e) subjecting at least a portion of the aqueous solution to electrochemical oxidation to form additional chlorine;
 wherein the electrochemical oxidation is carried out with an anode and cathode comprising a palladium-stabilized titanium,
 wherein the anode and cathode are separated by an ion exchange membrane, and
 wherein the cathode is a gas diffusion electrode operated as an oxygen depolarized cathode.

2. The process according to claim 1, further comprising introducing the additional chlorine into the gas mixture.

3. The process according to claim 2, wherein the introduction of the additional chlorine is carried out after separation of the aqueous solution portion from the gas mixture.

4. The process according to claim 1, further comprising removing at least a portion of the remaining water from the gas mixture after forming the aqueous solution of hydrogen chloride; and removing at least a portion of the oxygen from the gas mixture.

5. The process according to claim 4, wherein chlorine in the gas mixture after the removal of at least a portion of the remaining water and at least a portion of the oxygen is fed to a process for the production of isocyanates.

6. The process according to claim 4, wherein the hydrogen chloride reacted with the oxygen comprises a product from a process for the production of isocyanates, and wherein chlorine in the gas mixture after the removal of at least a portion of the remaining water and at least a portion of the oxygen is fed to the process for the production of isocyanates.

7. The process according to claim 1, wherein the aqueous solution subjected to electrochemical oxidation has a hydrogen chloride concentration of 10 to 25% wt.

8. The process according to claim 1, wherein the residual hydrogen chloride is separated completely from the gas mixture as the aqueous solution.

9. The process according to claim 1, wherein the hydrogen chloride reacted with the oxygen comprises a product from a process for the production of isocyanates.

10. The process according to claim 1, wherein the reaction of the hydrogen chloride and oxygen to form the gas mixture comprises thermal catalyzed oxidation.

11. The process according to claim 1, further comprising adding concentrated hydrochloric acid to the aqueous solution prior to the electrochemical oxidation.

12. The process according to claim 11, wherein the concentrated hydrochloric acid comprises a portion of the hydrogen chloride to be reacted with the oxygen wherein the portion is diverted prior to reacting with the oxygen and subjected to an absorption with dilute hydrochloric acid.

* * * * *